(12) United States Patent
Kusuda et al.

(10) Patent No.: US 11,395,482 B2
(45) Date of Patent: Jul. 26, 2022

(54) SPINNING REEL

(71) Applicant: Shimano Inc., Osaka (JP)

(72) Inventors: Shu Kusuda, Osaka (JP); Akira Niitsuma, Osaka (JP); Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/235,739

(22) Filed: Apr. 20, 2021

(65) Prior Publication Data

US 2021/0386046 A1   Dec. 16, 2021

(30) Foreign Application Priority Data

Jun. 10, 2020   (JP) .............................. JP2020-100992

(51) Int. Cl.
*A01K 89/01* (2006.01)
*A01K 89/033* (2006.01)

(52) U.S. Cl.
CPC ................................. *A01K 89/045* (2015.05)

(58) Field of Classification Search
CPC .. A01K 89/045; A01K 89/029; A01K 89/004; A01K 89/011223; A01K 89/0118
See application file for complete search history.

(56) References Cited

U.S. PATENT DOCUMENTS

| 5,372,323 | A | * | 12/1994 | Hirano | A01K 89/047 242/299 |
| 5,547,140 | A | * | 8/1996 | Kawabe | A01K 89/027 242/247 |
| 2007/0284466 | A1 | * | 12/2007 | Bin Abd Razak | A01K 89/027 242/246 |
| 2019/0327948 | A1 | * | 10/2019 | Chan | A01K 89/01907 |

FOREIGN PATENT DOCUMENTS

| EP | 3069607 A1 * | 9/2016 | ............. A01K 89/00 |
| JP | 2016174593 A5 * | 4/2018 | |
| JP | 6518520 B2 | 4/2019 | |

* cited by examiner

*Primary Examiner* — Emmanuel M Marcelo
(74) *Attorney, Agent, or Firm* — Global IP Counselors, LLP

(57) ABSTRACT

A spinning reel includes a rotor rotatable around an axis of a spool shaft, a handle shaft, a drive shaft rotatable around an axis of the handle shaft, a rotational transmission mechanism configured to transmit the rotation of the drive shaft to a rotor, a rotational control mechanism disposed between the handle shaft and the drive shaft and only transmitting rotation of the handle shaft in a reeling direction to the drive shaft and not transmitting rotation of the rotor in a casting direction from the drive shaft to the handle shaft, and a brake arranged to be in contact with the handle shaft and integrally rotatable with the drive shaft and configured to apply a braking force to the rotation of the handle.

10 Claims, 13 Drawing Sheets

SPINNING REEL

CROSS-REFERENCE TO RELATED APPLICATIONS

This application claims priority to Japanese Patent Application No. 2020-100992, filed on Jun. 10, 2020. The entire disclosure of Japanese Patent Application No. 2020-100992 is hereby incorporated herein by reference.

BACKGROUND

Field of the Invention

The present invention relates to a spinning reel.

Background Art

In fishing reels, a spinning reel is known, in which a one-way clutch is disposed between a handle shaft and a drive shaft to prevent a handle from reversing when a rotor rotates in the casting (line-delivering) direction (See Japanese Patent No. 6518520).

In such a conventional spinning reel, when torque that causes rotation in the reeling (line-winding) direction is generated due to the weight of the handle, the handle swings like a pendulum in association with the rotation of the rotor in the casting direction. Therefore, the spinning reel disclosed in Japanese Patent No. 6518520 includes a brake mechanism that suppresses reversal of the handle that can be accompanied with the rotation of the rotor in the reeling direction. The brake mechanism applies a braking force to the rotation of the handle in the direction opposite to the reeling direction.

SUMMARY

With a brake mechanism disclosed in Japanese Patent No. 6518520, when the handle is initially stationary the torque that is generated by the weight of the handle can cause the handle to rotate in the reeling direction. In the conventional reel, a one-way clutch can be engaged when the rotor rotates in the casting direction due to torque generated by the weight of the handle and the one-way clutch can be disengaged by the reversal of a drive shaft. Thus, it is difficult to suppress the swinging or oscillation of the handle.

Embodiments of the present invention can stably suppress or prevent the swinging or oscillation of a handle when a rotor rotates in the line-delivering direction.

A spinning reel according to one aspect of the present invention includes a reel body, a spool shaft, a spool, a rotor, a handle shaft, a drive shaft, a rotation transmission mechanism, a rotational control mechanism, and a brake. The spool shaft is supported by the reel body. The spool is supported by the spool shaft. The rotor is for winding a fishing line around the spool. The rotor is capable of rotating around the axis of the spool shaft. The handle shaft extends in the direction intersecting with the spool shaft and is supported by the reel body so as to be rotatable in the reeling direction and the direction opposite to the reeling direction. The drive shaft is capable of rotating around the axis of the handle shaft. The rotational transmission mechanism transmits the rotation of the drive shaft to the rotor. The rotational control mechanism is disposed between the handle shaft and the drive shaft and only transmits the rotation of the handle shaft in the reeling direction to the drive shaft and does not transmit the rotation of the rotor in the line-delivering direction from the drive shaft to the handle shaft. The brake integrally rotates with the drive shaft and is arranged to be in contact with the handle shaft to apply braking force to the rotation of the handle shaft.

In one embodiment of a spinning reel, the brake integrally rotates with the drive shaft, and thus, the braking force of the brake does not act on the handle shaft at all when the handle shaft rotates in the reeling direction. On the other hand, when the drive shaft rotates in the casting direction and rotational torque is generated in the handle shaft in the reeling direction due to the weight of the handle, a braking force is reliably applied by the brake since the brake is arranged to be in contact with the handle shaft. Therefore, the one-way clutch will not be engaged due to the relative rotation of the handle shaft and the drive shaft. In this manner, it is possible to stably suppress swinging or oscillation of the handle when the rotor rotates in the casting direction.

In one embodiment, the drive shaft has a hollow portion through which the handle shaft passes, and the brake can be arranged in the hollow portion of the driver shaft. In this embodiment, the reel body can be compact in the axial direction.

In one embodiment, the brake can be a sliding bearing supporting the handle shaft. Therefore, it is possible to apply a braking force to the rotation of the handle shaft while supporting the handle shaft with the sliding bearing.

In one embodiment, the handle shaft can have a shaft body and a tapered portion in which the outer diameter thereof decreases in size as the distance from the shaft body increases. The brake can include a supporting part on the inner periphery, which is formed to correspond to the tapered portion and supports the tapered portion. In this embodiment, the braking force can be easily adjusted.

The spinning reel can further include a first energizing member that presses the brake in the direction towards the shaft body from the tapered portion. In this embodiment, for example, the braking force can be adjusted by adjusting the energizing force of the energizing member.

The brake can be a friction plate that is in contact with the tip of the handle shaft. In this embodiment, it is possible to easily suppress the looseness of the handle shaft in the axial direction.

The spinning reel can further include an adjusting member that integrally rotates with the drive shaft and is capable of adjusting the braking force of the brake. In this embodiment, it is possible to adjust the braking force easily and swiftly.

The spinning reel can further include a handle, a drive gear, a pinion gear, and a second energizing member. The handle is disposed on the left side portion of the reel body. The drive gear is connected to the drive shaft so as to be integrally rotatable. The pinion gear extends in the axial direction of the spool shaft and meshes with the drive gear. The second energizing member energizes the drive gear in the direction away from the pinion gear. In this embodiment, it is possible to prevent the rotation of the handle in the reeling direction from becoming heavy.

The spinning reel can further include an elastic member that generates frictional force between the handle shaft and the rotational control mechanism. The rotational control mechanism is composed of the one-way clutch and can include an inner ring that is disposed on one of the drive shaft and the handle shaft so as to be integrally rotatable, an outer ring that is disposed on the other one of the drive shaft and the handle shaft so as to be integrally rotatable, and a plurality of rolling elements arranged between the inner ring and the outer ring. The elastic member is arranged between the handle shaft and the inner ring in the axial direction and can generate a frictional force between the handle shaft and the inner ring. In this embodiment, it is possible to prevent the position of the handle from swinging or oscillating when the handle is at a position where torque is generated in the reeling direction.

The spinning reel can further include the handle connected to the handle shaft. It is preferable that the torque required to switch the one-way clutch to an engaged state is larger than the torque generated by the weight of the handle and smaller than the braking force of the brake. In this embodiment, it is possible to prevent the position of the handle from swinging or oscillating.

According to embodiments of the present invention, it is possible to suppress the swinging or oscillating of the handle when the rotor rotates in the casting direction.

DETAILED DESCRIPTION OF EMBODIMENTS

Figure 1:
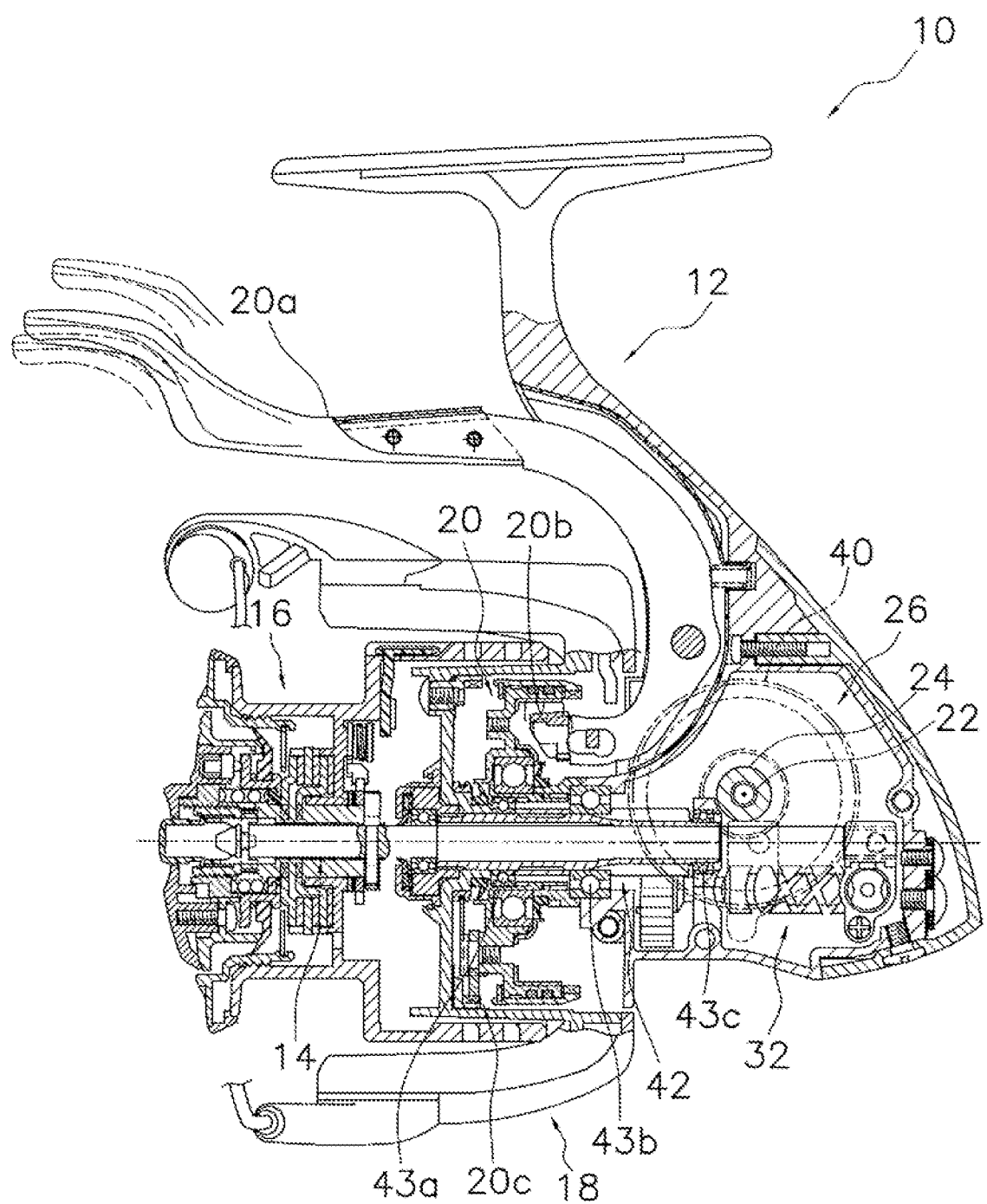
FIG. 1 is a cross-sectional side view of a spinning reel.

In the following description, an embodiment of a spinning reel according to one aspect of the present invention will be described with reference to the Figures. FIG. 1 is a cross-sectional side view of a spinning reel 10. When referring to FIG. 1, in order to make the explanation easier to understand, the left side of FIG. 1 is referred to as "front", the right side is referred to as "rear", the near side of the paper is referred to as "left", and the back side of the paper is referred to as "right".

Figure 2:
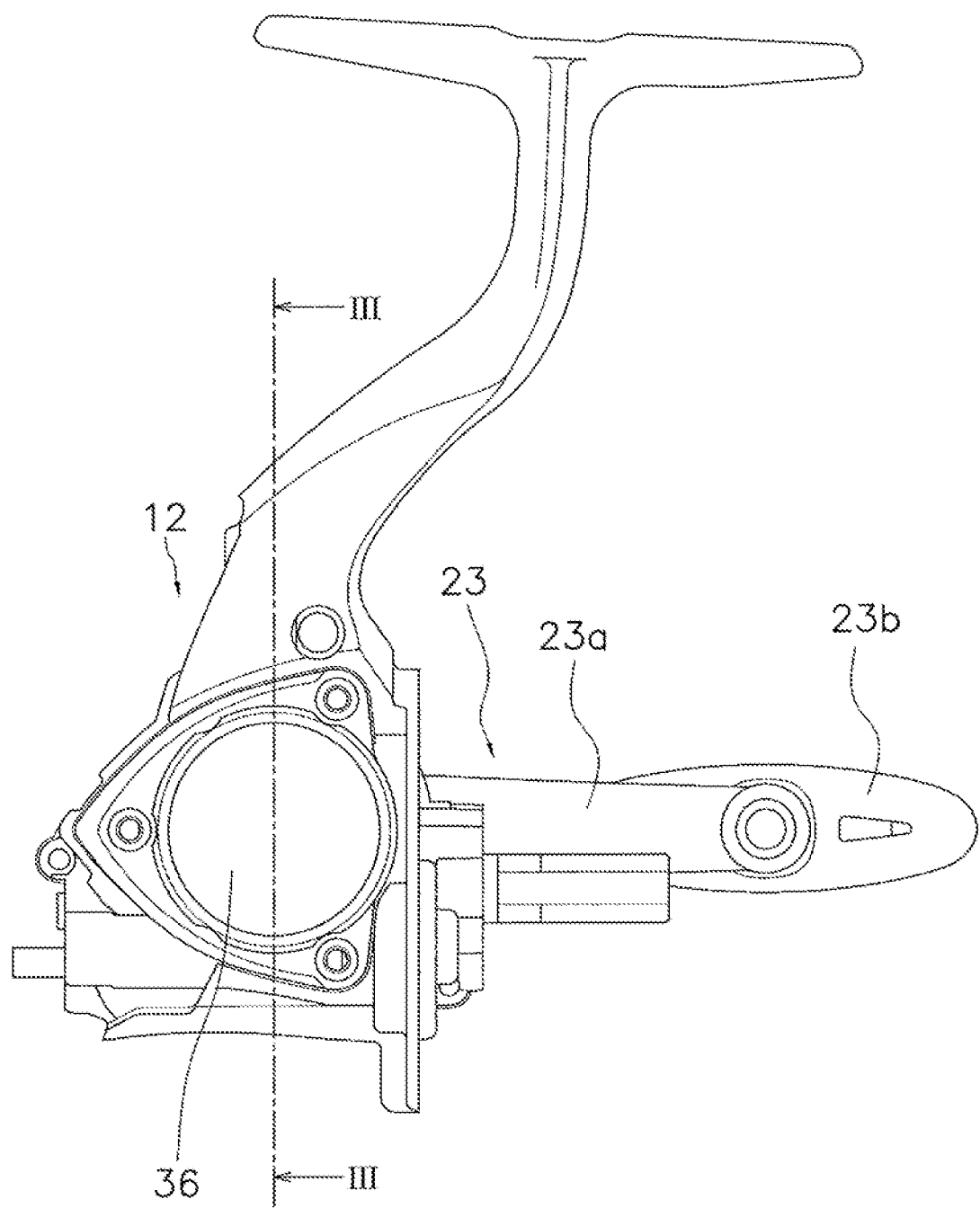
FIG. 2 is a side view of the spinning reel.
Figure 3:
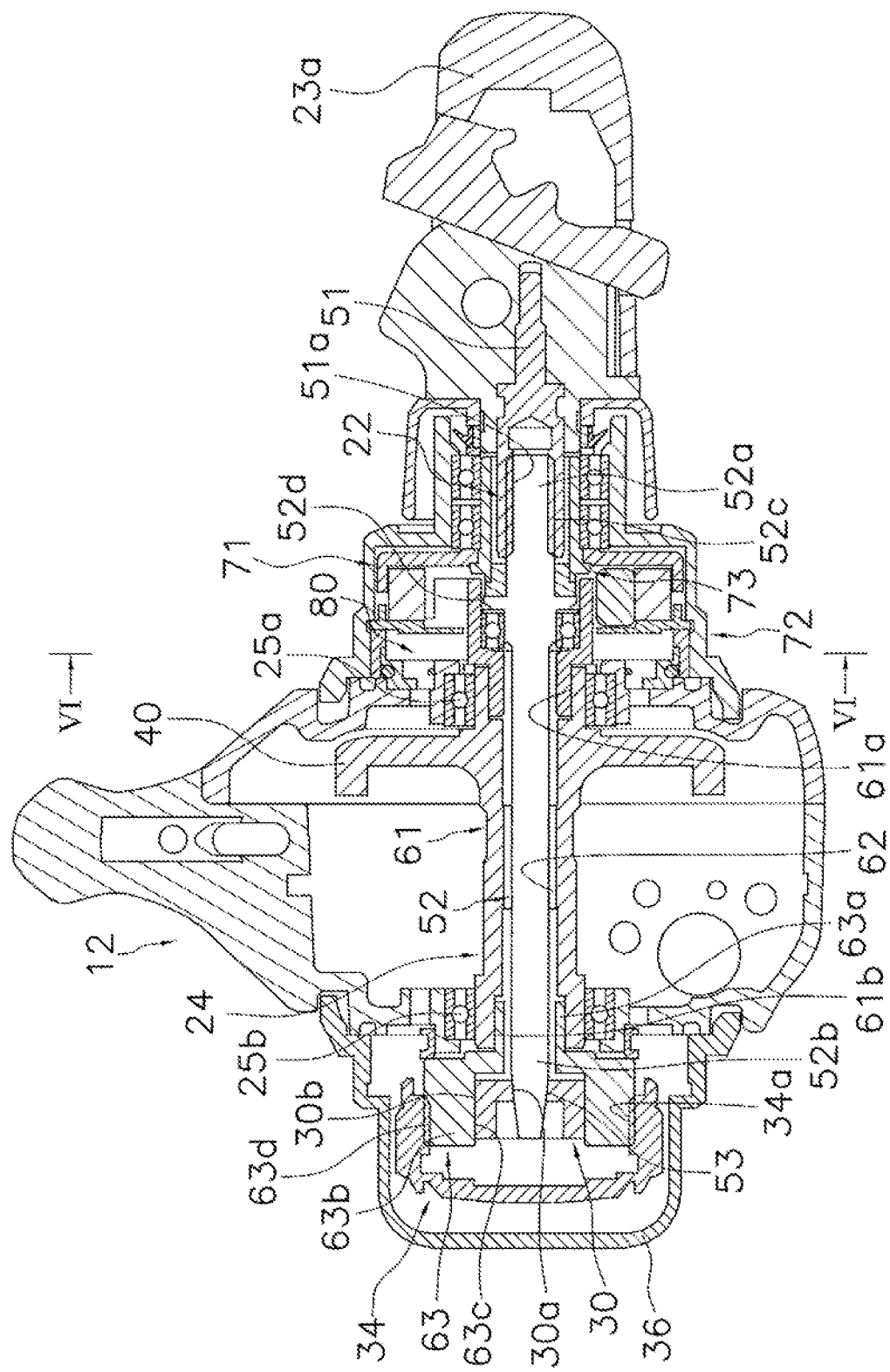
FIG. 3 is a cross-sectional view taken along line in FIG. 2.

The spinning reel 10 is a lever brake type reel and is capable of delivering a fishing line in a forward or casting. As shown in FIG. 1 to FIG. 3, the spinning reel 10 includes a reel body 12, a spool shaft 14, a spool 16, a rotor 18, a rotor brake 20, a handle shaft 22, a drive shaft 24, a rotational transmission mechanism 26, a rotational control mechanism 28, and a brake 30.

The reel body 12 has an internal space, and various types of mechanisms, such as the rotational transmission mechanism 26 and an oscillating mechanism 32, are housed in the internal space.

The spool shaft 14 extends in the front-to-rear direction. The spool shaft 14 is supported by the reel body 12 so as to be movable in the front-to-rear direction.

The spool 16 is a member around which the fishing line is wound on the outer periphery thereof. The spool 16 is supported by the spool shaft 14 and capable of integrally moving with the spool shaft 14.

The rotor 18 is capable of winding the fishing line around the spool 16 and is capable of rotating around the axis of the spool shaft 14.

The rotor brake 20 brakes the rotation of the rotor 18 in the casting direction. The rotor brake 20 includes a brake lever 20a, a brake part 20b, and a one-way clutch 20c. Since the rotor brake 20 has the same configuration as a conventional one, the description thereof will be omitted.

The handle shaft 22 extends in the direction intersecting the spool shaft 14. In this embodiment, the handle shaft 22 extends in the left-to-right direction. The handle shaft 22 is supported by the reel body 12 so as to be rotatable in the reeling direction and the direction opposite to the reeling direction. The handle 23 is attached to the handle shaft 22 so as to be integrally rotatable. The handle 23 is disposed on the left side portion of the reel body 12 when viewed from the rear side. The handle 23 includes a handle arm 23a and a handle part 23b. In FIG. 2, the spool 16 and the rotor 18 are not shown.

As shown in FIG. 3, the handle shaft 22 has an arm connecter 51, a shaft body 52, and a tapered portion 53. The arm connecter 51 connects the handle arm 23a and the shaft body 52 so as to be integrally rotatable. The shaft body 52 includes a first end part (left end) 52a, a second end part (right end) 52b, a male screw 52c, and a flange part 52d. The male screw 52c is formed on the outer peripheral surface of the first end part 52a. The male screw 52c is screwed into a female screw 51a formed on the arm connecter 51. The flange part 52d is disposed between the first end part 52a and the second end part 52b. The tapered portion 53 extends in the axial direction of the handle shaft 22 (hereinafter, simply referred to as "axial direction") from the second end part 52b of the shaft body 52, and the outer diameter of the tapered portion 53 decreases in size as the distance from the shaft body 52 increases. The tapered portion 53 is integral with the shaft body 52. The outer diameter of the tapered portion 53 is smaller than the outer diameter of the shaft body 52.

The drive shaft 24 is a hollow shaft member and is capable of rotating around the axis of the handle shaft 22. The drive shaft 24 is rotatably supported on the reel body 12 via bearings 25a, 25b arranged on the reel body 12.

The drive shaft 24 has a shaft portion 61, a hollow portion 62, and a housing 63. The shaft portion 61 extends in parallel to the handle shaft 22. The shaft portion 61 has a first hole 61a and a second hole 61b. The first hole 61a and the second hole 61b have non-circular cross-sections and are formed on respective ends of the shaft portion 61. The hollow portion 62 extends in the left-to-right direction so as to penetrate the drive shaft 24. The handle shaft 22 passes through the hollow portion 62.

The housing 63 is a cylinder-shaped member and is connected to the shaft portion 61 so as to be integrally rotatable. The inner periphery of the housing 63 continues into the hollow portion 62 and forms a part of the hollow portion 62. The housing 63 has a small diameter portion 63a and a large diameter portion 63b. The outer periphery of the small diameter portion 63a engages the second hole 61b. As a result, the housing 63 and the shaft portion 61 integrally rotate. The inner diameter of the large diameter portion 63b is larger than the inner diameter of the small diameter portion 63a. The outer diameter of the large diameter portion 63b is larger than the outer diameter of the small diameter portion 63a. The large diameter portion 63b has an engaging part 63c composed of an arc surface and a plain surface, for example, on the inner periphery thereof. The housing 63 can be integrated with the shaft portion 61.

A cap member 34 is attached to the large diameter portion 63b of the housing 63. A male screw 63d is formed on the outer periphery of the large diameter portion 63b. The male screw 63d is screwed into a female screw 34a formed on the cap member 34. The cap member 34 is covered by a cover member 36 fixed to the reel body 12.

The rotational transmission mechanism 26 transmits the rotation of the drive shaft 24 to the rotor 18. As shown in FIG. 1, the rotational transmission mechanism 26 includes a drive gear 40 and a pinion gear 42. The drive gear is connected to the drive shaft 24 so as to be integrally rotatable. In this embodiment, the drive gear 40 is integrally formed with the drive shaft 24. The pinion gear 42 extends in the front-to-rear direction and is connected to the rotor 18 so as to be integrally rotatable. The pinion gear 42 is rotatably supported by the reel body 12 via the bearings 43a, 43b, 43c arranged on the reel body 12. The pinion gear 42 meshes with the drive gear 40. The rotation of the drive shaft 24 is transmitted to the rotor 18 via the drive gear 40 and the pinion gear 42.

The rotational control mechanism 28 is disposed between the handle shaft 22 and the drive shaft 24 and only transmits the rotation of the handle shaft 22 in the reeling direction to the drive shaft 24 and does not transmit the rotation of the rotor 18 in the casting direction from the driver shaft 24 to the handle shaft 22. The rotational control mechanism 28 is composed of a one-way clutch 71.

Figure 4:
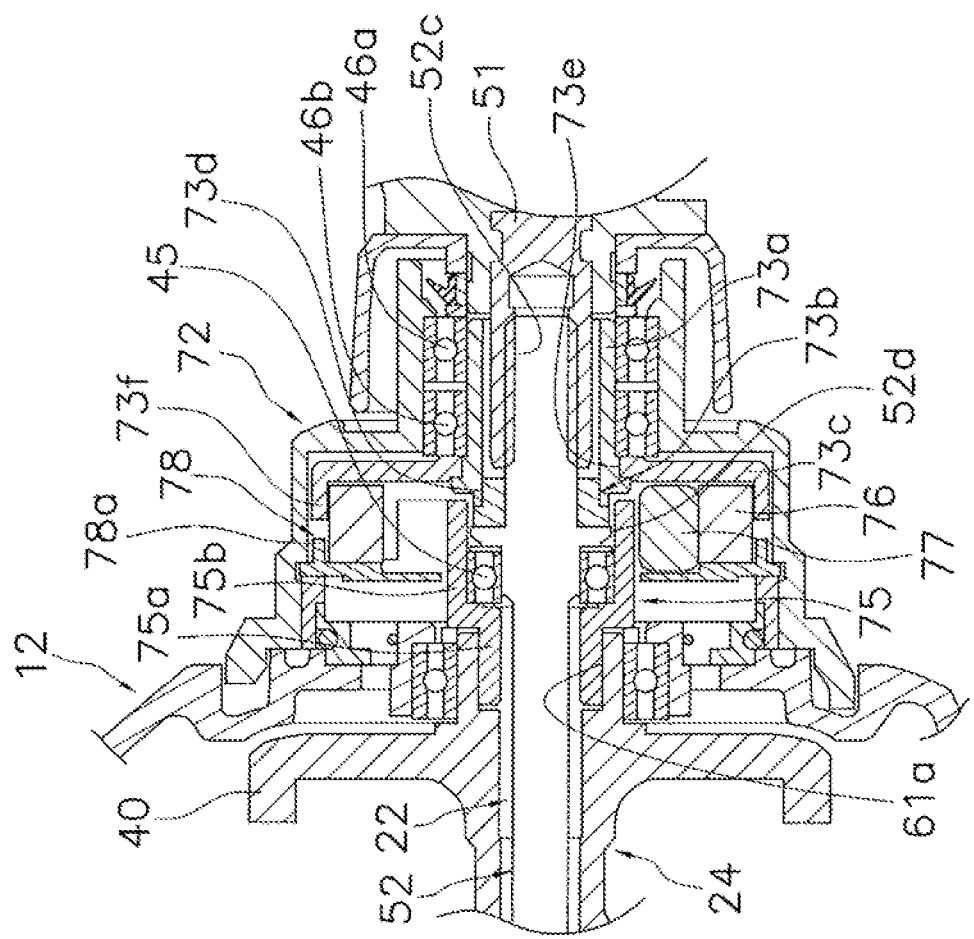
FIG. 4 is a partial enlarged view of FIG. 3.
Figure 5:
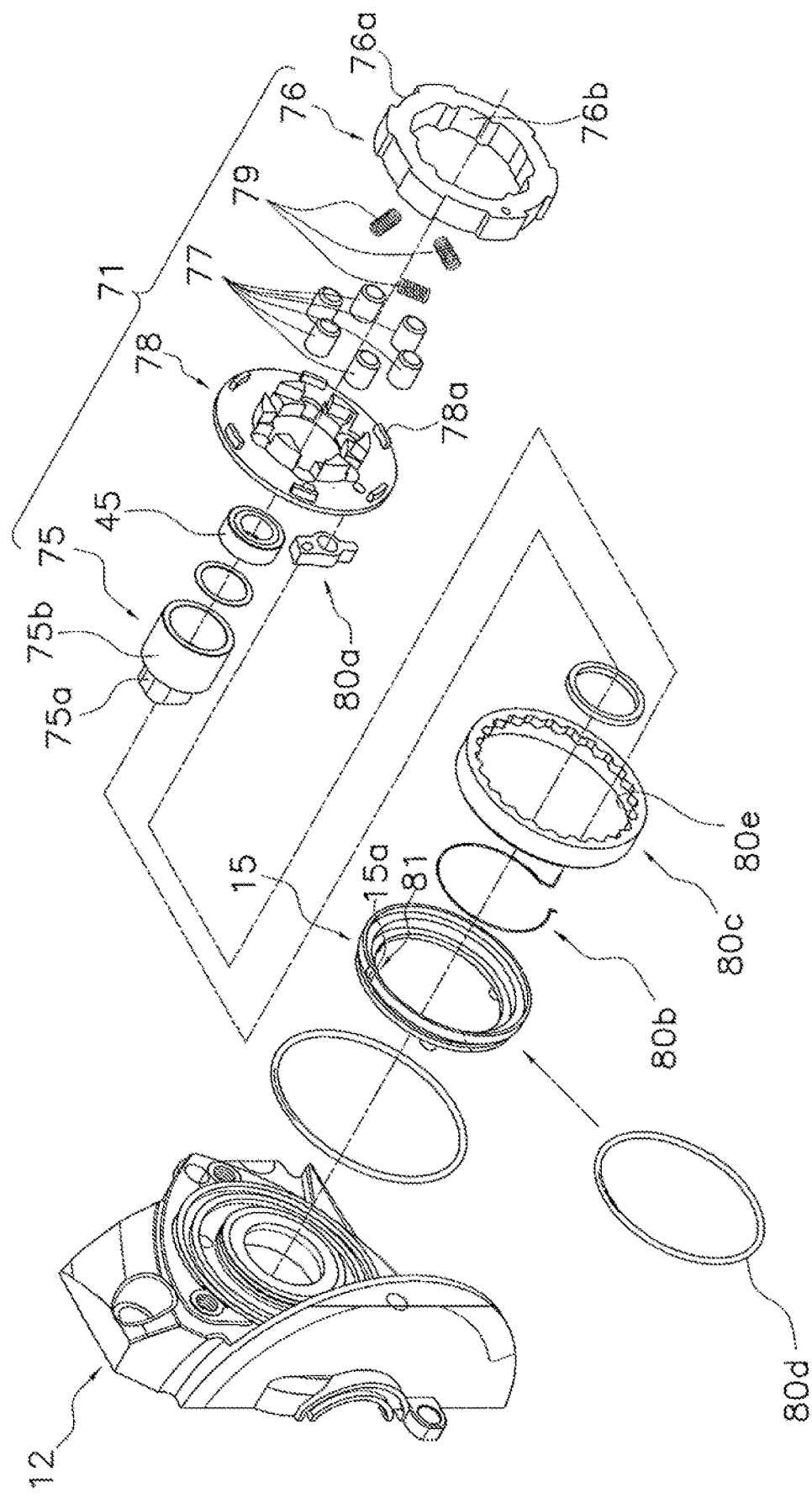
FIG. 5 is an exploded perspective view showing a portion of the configuration of a rotational control mechanism.

The one-way clutch 71 is a roller-type one-way clutch. As shown in FIGS. 4 and 5, the one-way clutch 71 includes an inner ring 75, an outer ring 76, a plurality of rolling elements 77, a holding member 78, and a plurality of energizing members 79 (See FIG. 5).

The inner ring 75 has a hollow stepped shape and is connected to the drive shaft 24 so as to be integrally rotatable. The inner ring 75 has a small diameter portion 75a and a large diameter portion 75b. The outer periphery of the small diameter portion 75a engages with the first hole 61a of the drive shaft 24, and thus, the inner ring 75 is connected to the drive shaft 24 so as to be integrally rotatable. A bearing 45 attached to the shaft body 52 of the handle shaft 22 and the flange part 52d of the handle shaft 22 are arranged on the inner periphery of the large diameter portion 75b. The inner ring 75 is rotatably supported by the handle shaft 22 via the bearing 45.

The outer ring 76 has a plurality of recesses 76a arranged on the outer periphery thereof at intervals in the circumferential direction and a plurality of cam faces 76b formed on the inner periphery thereof.

The plurality of rolling elements 77 are arranged between the inner ring 75 and the outer ring 76. The plurality of rolling elements 77 is movable in the circumferential direction to a transmission position where the rotation is transmitted and to a release position where the rotation is not transmitted.

The holding member 78 arranges the plurality of rolling elements 77 respectively in the circumferential direction at intervals. The holding member 78 has a plurality of protrusions 78a that engage the plurality of recesses 76a of the outer ring 76 and integrally rotates with the outer ring 76.

The energizing members 79 are coiled springs, for example, and energize the rolling elements 77 towards the release position.

The one-way clutch 71 is rotatably supported by a rotation support 72 fixed on the left side portion of the reel body 12. The rotation support 72 rotatably supports the handle shaft 22 via a connecter 73 that connects the handle shaft 22 and the outer ring 76 so as to be integrally rotatable. The rotation support 72 is a cylinder member and houses the one-way clutch 71 and bearings 46a, 46b that support the connector 73 in the inside thereof.

The connecter 73 includes a support shaft 73a, a spacer member 73b, and a disc 73c. The support shaft 73a is rotatably supported by the rotational support 72 via the bearings 46a, 46b. The support shaft 73a and the space member 73b are also included in the configuration of the handle shaft 22.

The space member 73b is arranged between the support shaft 73a and the shaft body 52 of the handle shaft 22 and connects the support shaft 73a and the shaft body 52 so as to be integrally rotatable and also locks the male screw 52c of the shaft body 52. The spacer member 73b is attached to the outer periphery of the shaft body 52. The spacer member 73b has a rectangular engaging part 73d on the outer periphery thereof, which engages the inner periphery of the support shaft 73a. The spacer member 73b is pressed by the flange part 52d of the shaft body 52 and connects the shaft body 52 to the support shaft 73a so as to integrally rotatable.

The disc 73c has a non-circular hole 73e that engages the outer periphery of the support shaft 73a and integrally rotates with the support shaft 73a. The disc 73c has a plurality of protrusions 73f that engage the plurality of recesses 76a of the outer ring 76.

As shown in FIG. 3, the brake 30 applies a braking force to the rotation of the handle shaft 22. The brake 30 integrally rotates with the drive shaft 24 and is arranged to be in contact with the handle shaft 22. The brake 30 is housed in the large diameter portion 63b of the housing 63.

The brake 30 in this embodiment is composed of a sliding bearing that supports the handle shaft 22. In particular, the brake 30 has a supporting part 30a. The supporting part 30a is formed on the inner periphery of the brake 30. The supporting part 30a supports the tapered portion 53 and applies a braking force to the rotation of the handle shaft 22 by contacting the tapered portion 53. The supporting part 30a has a shape corresponding to the shape of the tapered portion 53. That is, the supporting part 30a is formed so that the outer diameter thereof decreases in size as the distance from the shaft body 52 of the handle shaft 22 increases.

The brake 30 has an engaged part 30b on the outer periphery thereof, that engages the engaging part 63c of the large diameter portion 63b of the housing 63 so as to be integrally rotatable. The brake 30 is fixed to the inner periphery of the large diameter portion 63b of the housing 63 by press fitting and such. The brake 30 can be restricted from moving in the axial direction by, for example, a spring member that prevents slipping-out.

Figure 6:
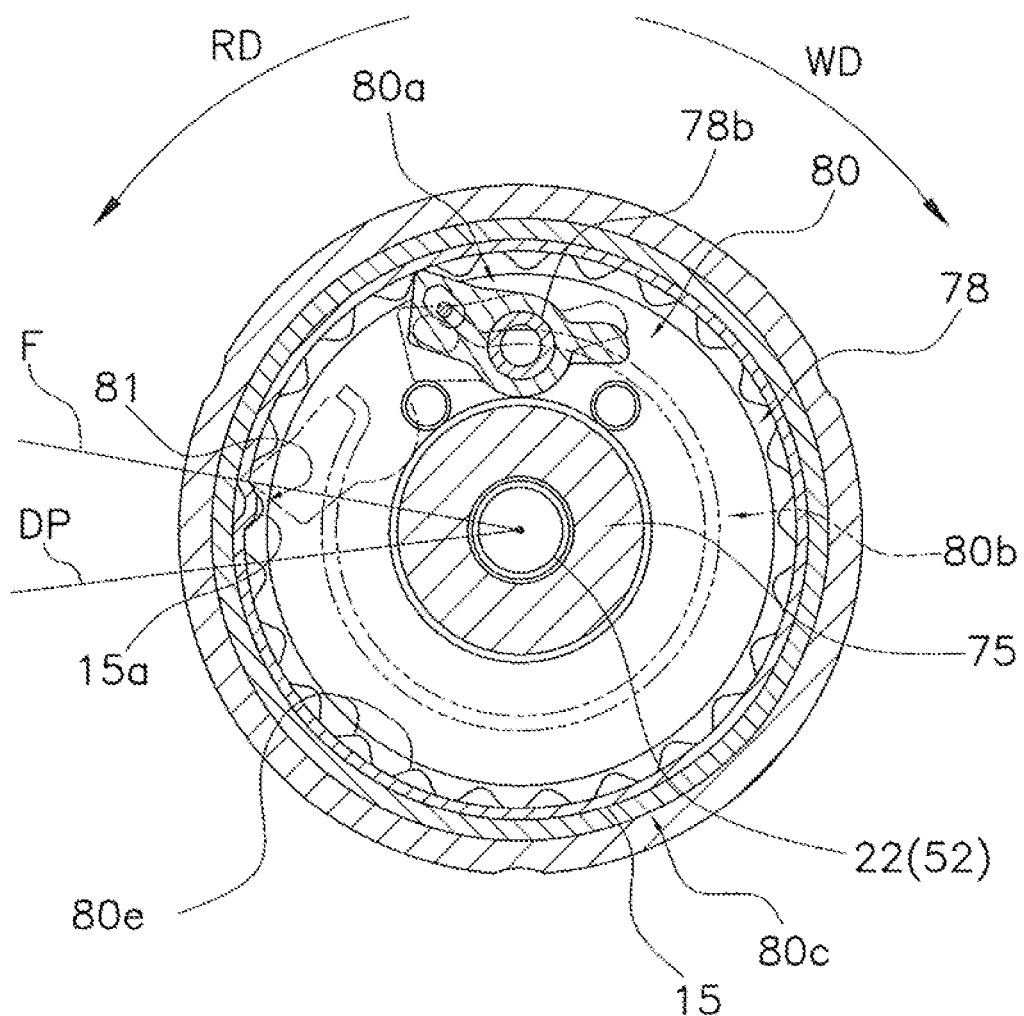
FIG. 6 is a cross-sectional view taken along line IV-IV in FIG. 3.

The spinning reel 10 can further includes a handle brake 80 and a handle stop 81, as shown in FIGS. 3, 5, and 6. Since the handle brake 80 and the handle stop 81 have the same configurations as those in the prior art, they will be briefly described.

As shown in FIG. 6, the handle brake 80 applies a braking force to the rotation of the handle shaft 22 in the direction opposite to the reeling direction. In FIG. 6, RD refers to the reeling direction and the WD refers to the opposite direction of the reeling direction (i.e., the casting direction).

The handle brake 80 includes a pawl member 80a, a spring member 80b, a brake member 80c, and an elastic ring 80d. The pawl member 80a is attached to a swing shaft 78b disposed on the holding member 78 so as to be rotatable. The pawl member 80a rotates between an engaging position at which the pawl member 80a engages the brake member 80c and a non-engaging position at which the pawl member 80a separates from the brake member 80c.

The spring member 80b energizes the pawl member 80a towards the engaging position when the handle shaft 22 rotates in the direction opposite to the reeling direction and energizes the pawl member 80a towards the non-engaging position when the handle shaft 22 rotates in the reeling direction. In FIG. 6, since the spring member 80b does not appear in the cross-section, the spring member 80b is shown by a chain double-dashed line.

The brake member 80c is a metal ring-shaped member rotatably attached to the reel body 12 around the axis of the drive shaft 24. The brake member 80c has a plurality of internal teeth 80e with which the pawl member 80a engages. The brake member 80c is rotatably attached to an annular member 15 fixed to the reel body 12.

The elastic ring 80d is attached to the annular member 15 in a compressed state and frictionally engages the brake member 80c. As a result, the rotation of the handle shaft 22 in the reverse direction is braked by the brake member 80c via the pawl member 80a and the holding member 78.

The handle stop 81 stops the handle shaft 22 at a predetermined rotational phase F only when the handle shaft 22 rotates in the direction opposite to the reeling direction. The predetermined rotational phase F is a position on the front of the bottom dead center DP on the handle 23 side.

The handle stop 81 includes the pawl member 80a and a projection 15a disposed on the annular member 15. When the rotation of the handle shaft 22 in the reverse direction is being braked, if the holding member 78 rotates in the reverse direction and the pawl member 80a engages with the projection 15a, the rotation of the handle shaft 22 in the reverse direction stops.

In the spinning reel 10 having the above configuration, the brake 30 integrally rotates with the drive shaft 24, therefore, the braking force of the brake 30 does not act on the handle shaft 22 when the handle shaft 22 rotates in the reeling direction. Specifically, when the handle shaft 22 is rotated in the reeling direction, the rotation of the handle shaft 22 is transmitted to the drive shaft 24 via the rotational control mechanism 28, therefore, the braking force of the brake 30 that integrally rotates with the drive shaft 24 does not act on the handle shaft 22 at all. On the other hand, since the brake 30 is arranged to be in contact with the handle shaft 22, with respect to the rotation of the handle shaft 22 in the direction opposite to the reeling direction, the braking force of the brake 30 acts on the handle shaft 22. In this manner, it is possible to suppress the rotation of the handle 23 in the direction opposite to the reeling direction when the rotor 18 is rotating in the casting direction.

Furthermore, when the driver shaft 24 is rotating in the casting direction and the weight of the handle 23 generates rotational torque on the handle shaft 22 in the reeling direction, the braking force of the brake 30 acts on the handle shaft 22. Therefore, the one-way clutch 71 is not switched to the engaged state due to the relative rotation of the handle shaft 22 and the drive shaft 24. Additionally, the brake 30 is arranged to be in contact with the handle shaft 22, and thus, it is possible for the brake 30 to reliably apply a braking force. In this manner, when the rotor 18 is rotating in the casting direction, it is possible to stably suppress the swinging or oscillation of the handle 23, even when the handle 23 is initially stationary and at a position where torque rotating in the reeling direction is generated. Additionally, since the portion where the handle shaft 22 and the brake 30 come into contact with each other is tapered, it is possible to finely adjust the braking force by adjusting the position of the brake 30 in the axial direction, for example.

Meanwhile, it is preferable that the torque required to put the one-way clutch 71 in a connected state is larger than the torque generated by the weight of the handle 23 and smaller than the braking force of the brake 30. When this relationship is satisfied, it is possible to effectively suppress the swinging or oscillation of the handle 23.

Other Embodiment

One embodiment of the present invention has been described above, however, the present invention is not limited to the above embodiment and various modifications are possible without deviating from the gist of the invention. Particularly, a plurality of embodiments and modifications described in the present specification can be combined as needed.

Figure 7:
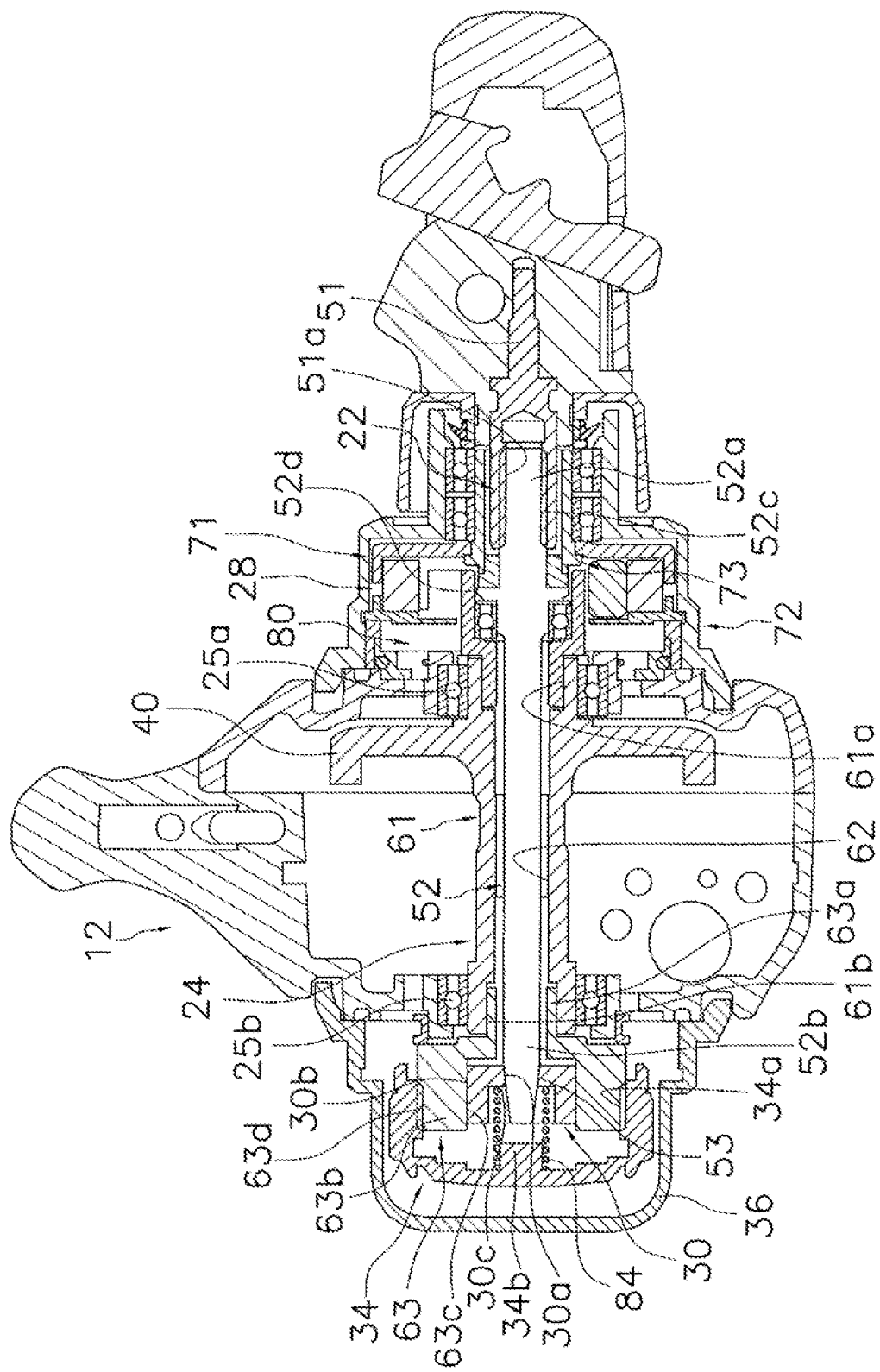
FIG. 7 is a view of a spinning reel according to another embodiment, corresponding to FIG. 3.

As shown in FIG. 7, a spinning reel 10 can further include energizing members 84. The energizing members 84 are one example of a first energizing member. The energizing members 84 can be coiled springs in one embodiment, for example. The energizing members 84 press the brake 30 in the direction towards a shaft body 52 of a handle shaft 22 from a tapered portion 53. The brake 30 has a pressed surface 30c pressed by the energizing members 84 on the inner periphery thereof. The energizing members 84 are supported by a support projection 34b formed on a cap member 34. In this embodiment, the brake 30 does not have to be fixed to the inner periphery of a large diameter portion 63b of a housing 63 by press-fitting and such. Additionally, the cap member 34 can be configured as an adjusting member that is capable of adjusting the braking force of the brake 30. Here, the cap member 34 adjusts the braking force of the brake 30 by adjusting the energizing force of the energizing members 84. Since the cap member 34 moves in the axial direction with respect to the housing 63 due to the rotary operation of the cap member 34, the energizing force of the energizing members 84 is adjusted.

Figure 8:
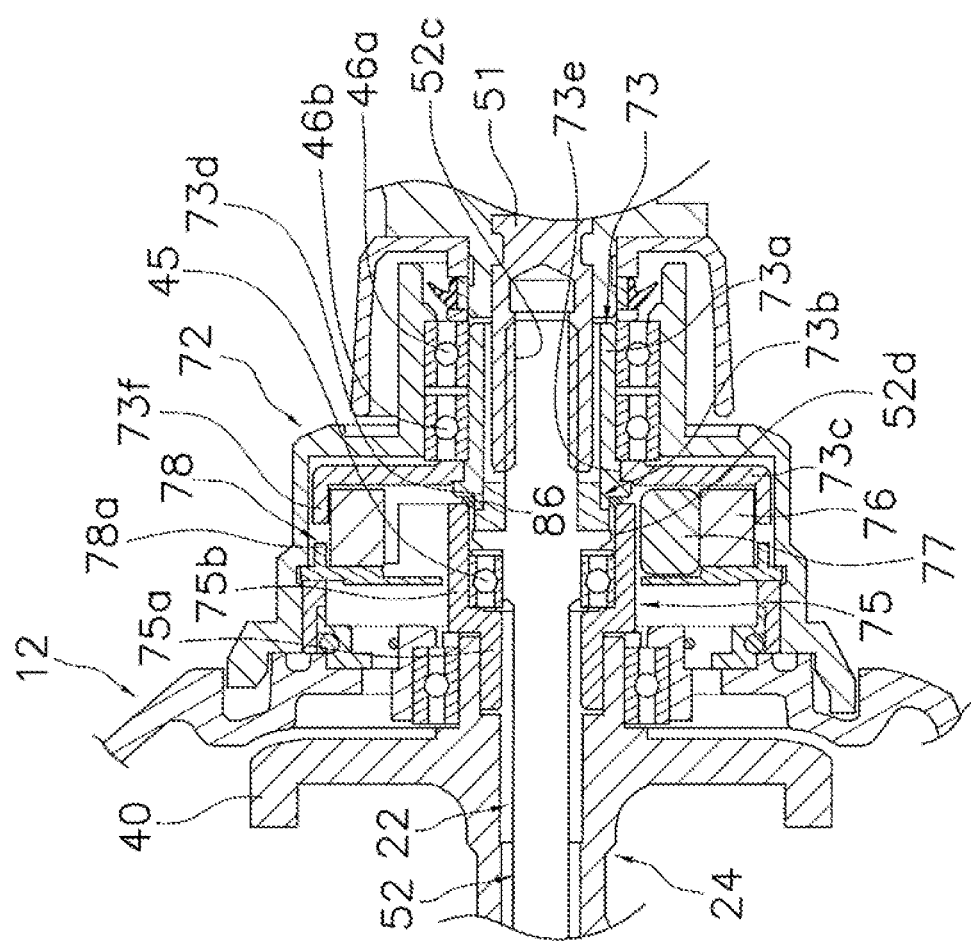
FIG. 8 is a view of the spinning reel according to another embodiment, corresponding to FIG. 4.

As shown in FIG. 8, the spinning reel 10 can further include an elastic member 86. The elastic member 86 generates frictional force between a handle shaft 22 and a rotational control mechanism 28. Here, the elastic member 86 is arranged between a support shaft 73a of a handle shaft 22 and an inner ring 75 in the axial direction and generates frictional force between the support shaft 73a and the inner ring 75. In this embodiment, when a rotor 18 rotates in the casting direction, a force rotates the handle shaft 22 in the direction opposite to the reeling direction. Therefore, when a handle 23 is at a position where torque is generated in the reeling direction, it is possible to prevent the position of the handle 23 from swinging or oscillation.

Figure 9:
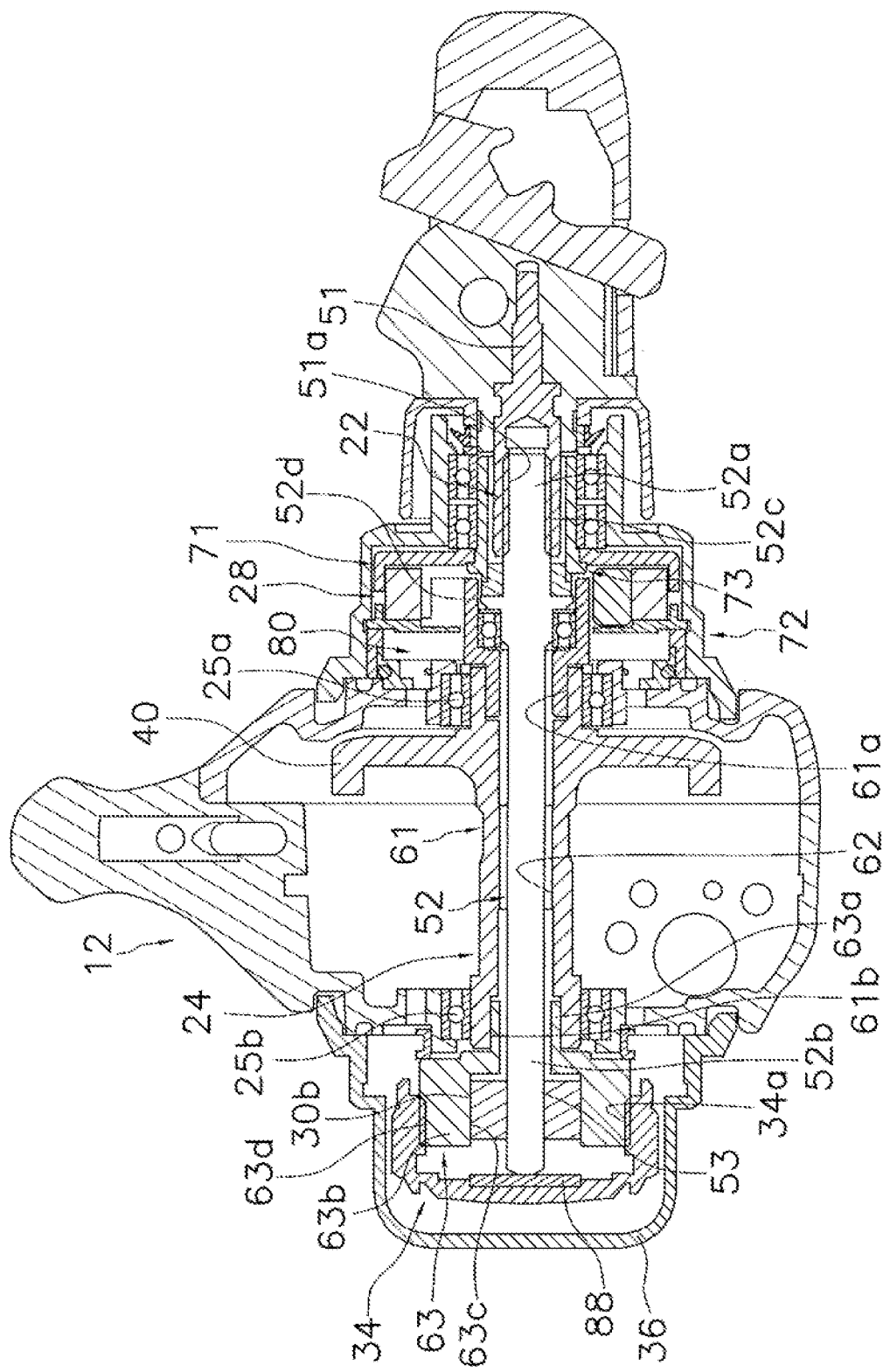
FIG. 9 is a view of a spinning reel according to another embodiment, corresponding to FIG. 3.

In the above embodiment, a sliding bearing is used as the brake 30, however, the brake 30 is not limited to this embodiment. For example, as shown in FIG. 9, it is possible to apply a braking force by arranging a friction plate 88 (one example of a brake) on the inner periphery of a cap member 34 and bringing the tip of a handle shaft 22 at a second end portion 52b side into contact with the friction plate 88. Even in this embodiment, the cap member 34 can be configured as an adjusting member that is capable of adjusting the braking force of the friction plate 88. Here, the braking force of the friction plate 88 is adjusted by adjusting the pressing force of the friction plate 88. In this embodiment, tapered portion 53 is omitted and the brake 30 in the above embodiment is changed to a simple sliding bearing or a rolling bearing.

Figure 10:
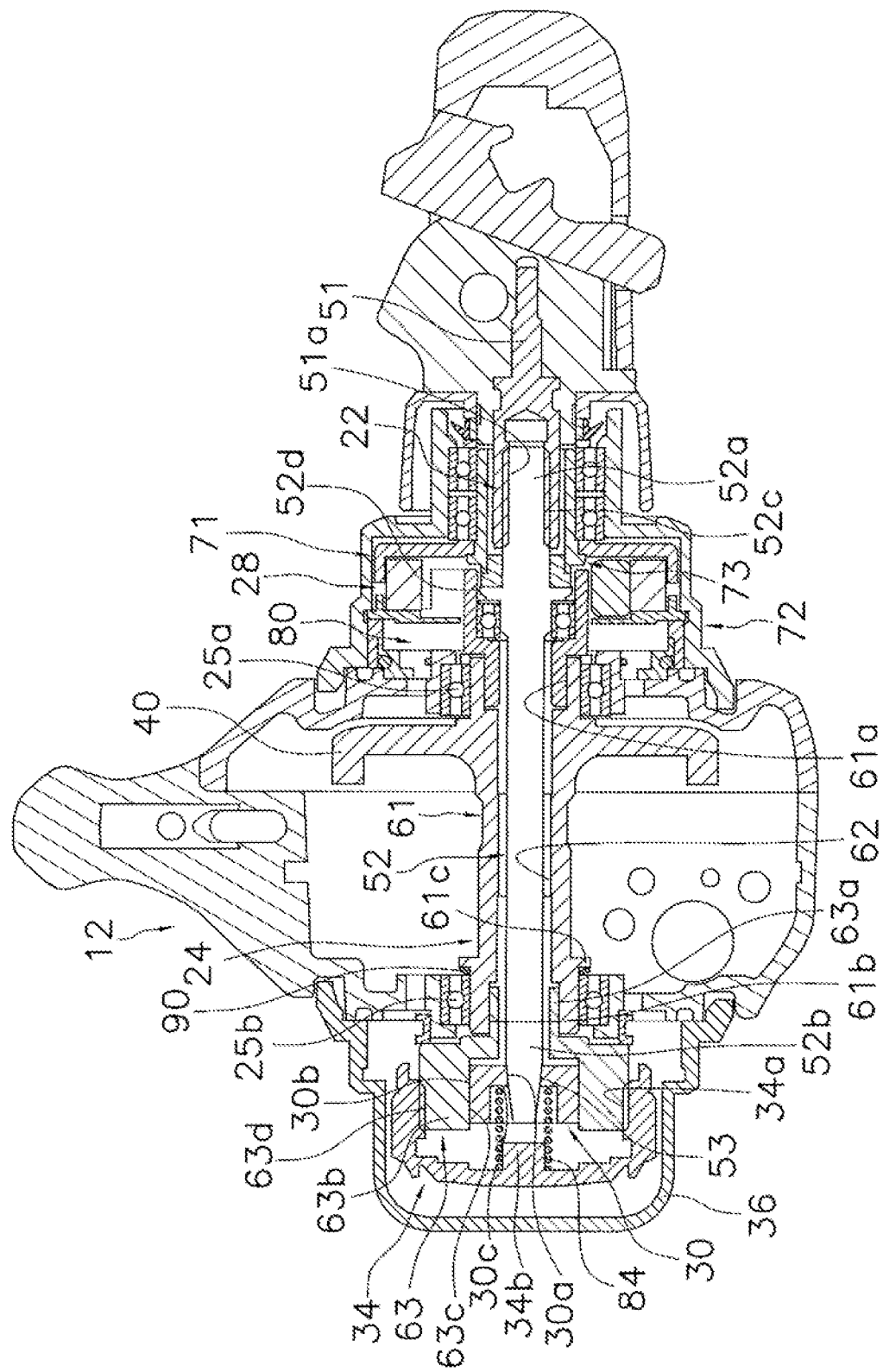
FIG. 10 is a view of a spinning reel according to another embodiment, corresponding to FIG. 3.

As shown in FIGS. 7 and 9, in the spinning reel including the handle 23 on the left side portion of the reel body 12, with a configuration in which the brake 30 or the friction plate 88 is pressed in the axial direction, the drive shaft 24 is pressed in the direction away from the handle 23 by the energizing members 84 via the cap member 34. As a result, a drive gear 40 can be pressed against a pinion gear 42 via the drive shaft 24 and the rotation of the handle 23 in the reeling direction can become heavy. Therefore, as shown in FIG. 10, the spinning reel 10 can include an energizing member 90 for reducing the pressing force by which the drive shaft 24 is pressed. The energizing member 90 is one example of a second energizing member. The energizing member 90 is a disc spring, for example. The energizing member 90 is arranged, for example, between a bearing 25*b* and a flange part 61*c* disposed on a shaft portion 61 of the drive shaft 24 in the axial direction. A flange portion 24*a* is arranged closer to a second hole 61*b* side than the drive gear 40. The energizing member 90 suppresses the drive gear 40 from being pressed against the pinion gear 42.

Figure 11:
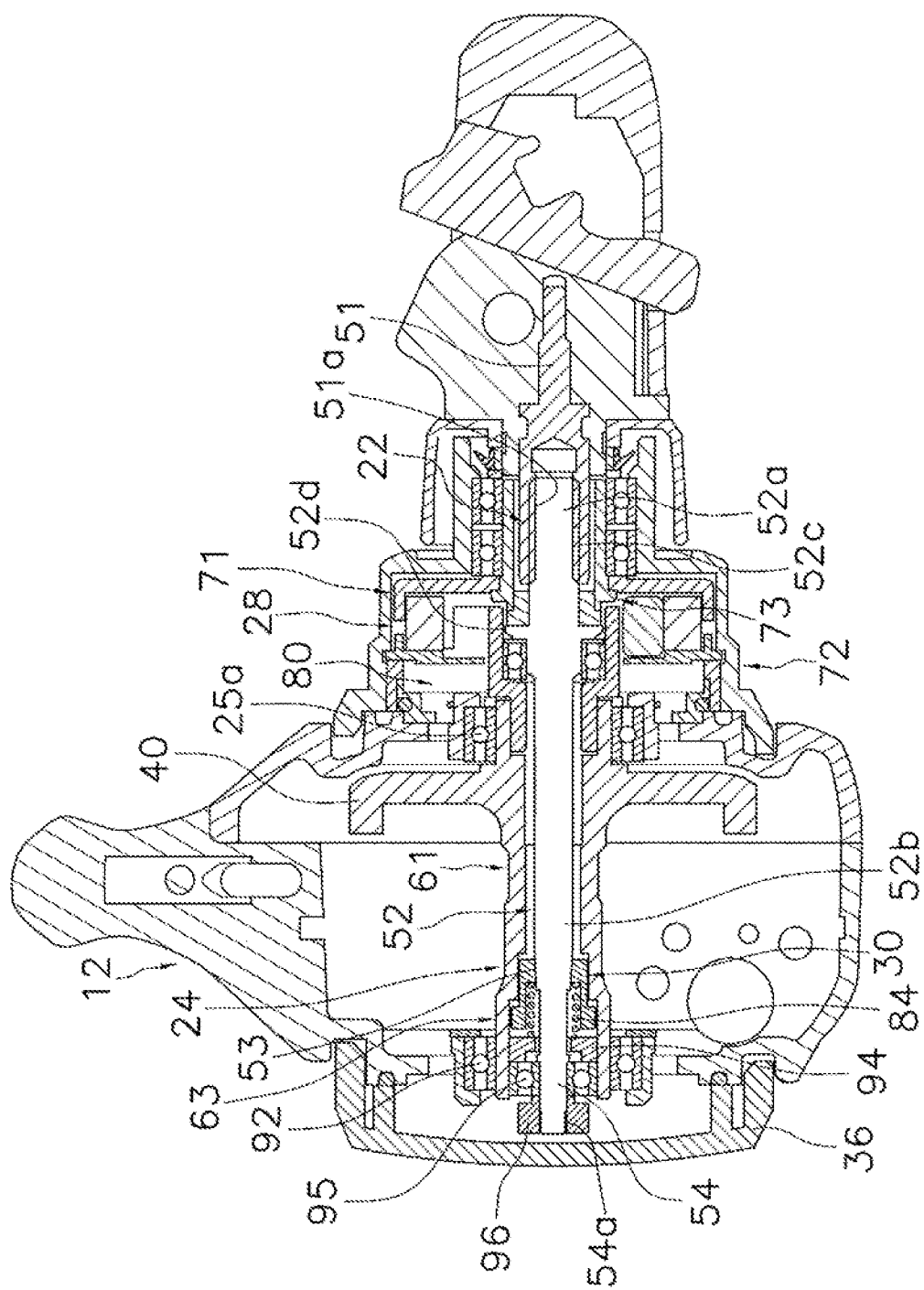
FIG. 11 is a view of a spinning reel according to another embodiment, corresponding to FIG. 3.

In the embodiment shown in FIG. 10, the drive gear 40 is prevented from being pressed against the pinion gear 42 by the energizing member 90, however, in this embodiment, the energizing force of the energizing member 90 changes according to the position of the drive shaft 24. Therefore, the energizing force of the energizing member 90 can vary. Therefore, as shown in FIG. 11, in the spinning reel including the handle 23 on the left side portion of a reel body 12, the reel can be configured so that the reactive force of the energizing members 84 does not act on a drive shaft 24. In the embodiment shown in FIG. 11, the housing 63 is integral with a shaft portion 61. The housing 63 is rotatably supported by a bearing 92 arranged on the reel body 12. A brake 30, energizing members 84, a collar member 94, and a rolling bearing 95 are housed inside of the housing 63.

The energizing members 84 are arranged in a compressed state between the brake 30 and the collar member 94. The energizing members 84 energize the brake 30 in the direction approaching the handle 23. The energizing members 84 energize the collar member 94 in the direction away from the handle 23. The collar member 94 transmits the energizing force of the energizing members 84 to an outer ring of the rolling bearing 95. The collar member 94 is housed in the housing 63 so as to be integrally rotatable with the housing 63. A handle shaft 22 has an extended portion 54 that extends from a tapered portion 53 in the axial direction. The rolling bearing 95 rotatably supports the extended portion 54. On the outer periphery of the tip of the extended portion 54, a male screw 54*a* is formed and a cap member 96 is screwed into the male screw 54*a*. The cap member 96 is arranged to be in contact with an inner ring of the rolling bearing 95 to prevent the rolling bearing 95 from coming off from the housing 63. In this embodiment, the collar member 94 and the energizing members 84 are prevented from disengaging with the housing 63. With this configuration, the drive gear 40 is not pressed against the pinion gear 42 by the energizing members 84, and thus, an energizing member 90 can be omitted.

Figure 12:
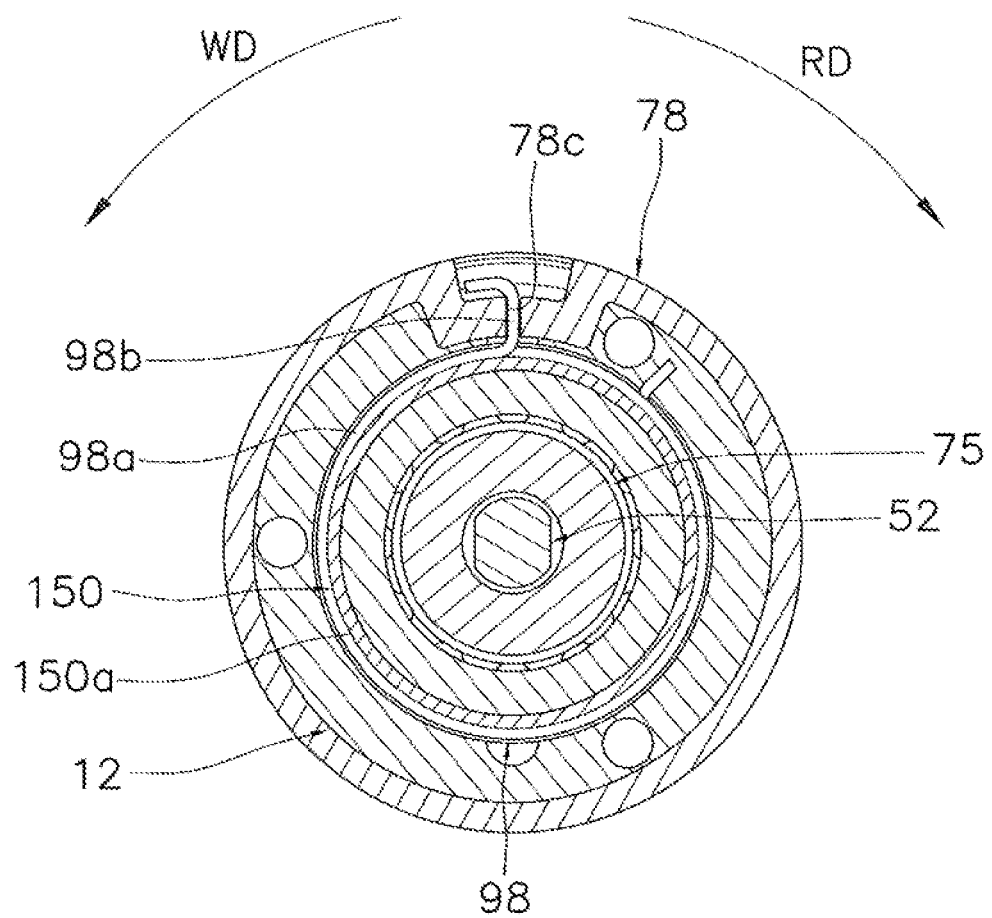
FIG. 12 is a cross-sectional view illustrating a modification of a handle brake.
Figure 13:
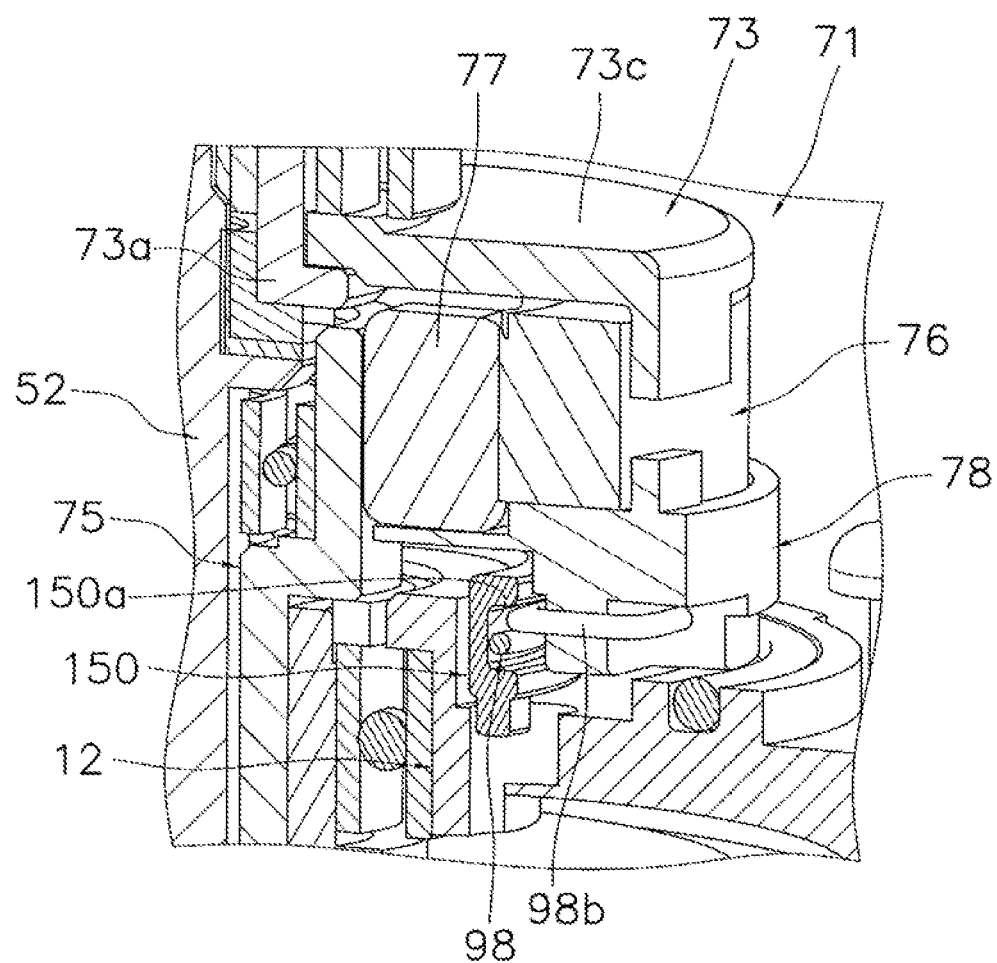
FIG. 13 is a cross-sectional perspective view illustrating a modification of the handle brake.

As shown in FIGS. 12 and 13, a handle brake 80 can be configured by a spring member 98 formed by bending a metal spring wire. FIG. 12 is a cross-sectional view of the periphery of an annular member 150 fixed to the reel body 12 along a plain surface orthogonal to a drive shaft 24. The spring member 98 has an annular portion 98*a* and a spring hook 98*b*. The annular portion 98*a* is attached to an annular groove 150*a* formed on the outer periphery of the annular member 150 so as to be frictionally engageable. The spring hook 98*b* extends radially outward from the annular portion 98*a*. The spring hook 98*b* is hooked on a holding member 78 of a one-way clutch 71. The tip of the spring hook 98*b* is curved in the direction along the annular portion 98*a*. A holding groove 78*c* extending in the radial direction is formed on the holding member 78 and the spring hook 98*b* is hooked on the holding groove 78*c*. Meanwhile, the groove width of the holding groove 78*c* is preferably set to be minimized with respect to the wire diameter of the spring member 98. In this embodiment, it is possible to reduce the looseness of the spring member 98 in the rotational direction and also to prevent the spring member 98 from disengaging from the holding member 78.

In the embodiment in which the handle brake 80 is composed of the spring member 98, when the handle 23 rotates in the direction RD opposite to the reeling direction WD, the holding member 78 rotates in the reeling direction WD, and thus, the diameter of the annular portion 98*a* of the spring member 98 decreases in size. As such, the rotational resistance when the annular portion 98*a* and the annular groove 150*a* are frictionally engaged increases and the handle 23 is braked. On the other hand, when the handle 23 rotates in the reeling direction WD, the holding member 78 rotates in the reeling direction WD, and thus, the diameter of the annular portion 98*a* of the spring member 98 increases. As such, the rotational resistance when the annular portion 98*a* and the annular groove 150*a* are frictionally engaged decreases and the braking force by the handle brake 80 barely acts on the handle 23.

In the above embodiment, the inner ring 75 is connected to the drive shaft 24 so as to be integrally rotatable and the outer ring 76 is connected to the handle shaft 22 so as to be integrally rotatable. However, the inner ring 75 can be connected to the handle shaft 22 so as to be integrally rotatable and the outer ring 76 can be connected to the drive shaft 24 so as to be integrally rotatable.

What is claimed is:

1. A spinning reel comprising:
    a reel body;
    a spool shaft supported by the reel body;
    a spool supported by the spool shaft;
    a rotor rotatable around an axis of the spool shaft, and configured to wind fishing line around the spool;
    a handle shaft extending in a direction intersecting the spool shaft and supported by the reel body so as to be rotatable in a reeling direction and a casting direction opposite to the reeling direction;
    a drive shaft rotatable around an axis of the handle shaft;
    a rotational transmission mechanism configured to transmit the rotation of the drive shaft to the rotor;
    a rotational control mechanism disposed between the handle shaft and the drive shaft and only transmitting rotation of the handle shaft in the reeling direction to the drive shaft and not transmitting rotation of the rotor in the casting direction from the drive shaft to the handle shaft; and
    a brake arranged to be in contact with the handle shaft and integrally rotatable with the drive shaft and configured to apply a braking force to the rotation of the handle shaft.

2. The spinning reel according to claim 1, wherein
    the drive shaft has a hollow portion through which the handle shaft passes; and the brake is arranged in the hollow portion of the driver shaft.

3. The spinning reel according to claim 1, wherein the brake is a sliding bearing that supports the handle shaft.

4. The spinning reel according to claim 3, wherein
the handle shaft has a shaft body and a tapered portion in which the outer diameter thereof decreases as a distance from the shaft body increases; and
the brake includes a supporting part on an inner periphery thereof, which corresponds to the tapered portion and supports the tapered portion.

5. The spinning reel according to claim 4, further comprising
a first energizing member pressing the brake in a direction towards the shaft body from the tapered portion.

6. The spinning reel according to claim 5, further comprising
an adjusting member configured to integrally rotate with the drive shaft and is capable of adjusting the braking force of the brake.

7. The spinning reel according to claim 5, further comprising;
a handle disposed on a left side portion of the reel body and connected to the handle shaft,
a drive gear connected to the drive shaft so as to be integrally rotatable;
a pinion gear extending in an axial direction of the spool shaft and configured to mesh with the drive gear; and
a second energizing member configured to energize the drive gear in a direction away from the pinion gear.

8. The spinning reel according to claim 1, wherein
the brake is a friction plate that is in contact with a tip of the handle shaft.

9. The spinning reel according to claim 1, further comprising
an elastic member configured to generate a frictional force between the handle shaft and the rotational control mechanism,
the rotational control mechanism is composed of a one-way clutch and includes an inner ring disposed on one of the drive shaft and the handle shaft so as to be integrally rotatable, an outer ring disposed on an other one of the drive shaft and the handle shaft so as to be integrally rotatable, and a plurality of rolling elements arranged between the inner ring and the outer ring, and
the elastic member is arranged between the handle shaft and the inner ring in an axial direction and is configured to generate a frictional force between the handle shaft and the inner ring.

10. The spinning reel according to claim 1, further comprising
a handle connected to the handle shaft,
the rotational control mechanism being composed of a one-way clutch; and
a torque required to switch the one-way clutch to an engaged state is larger than a torque generated by a weight of the handle and smaller than the braking force of the brake.

* * * * *